United States Patent
Park et al.

(10) Patent No.: US 10,507,575 B2
(45) Date of Patent: Dec. 17, 2019

(54) ATTITUDE-SUPPORTING APPARATUS OF WEARABLE ROBOT AND ATTITUDE-SUPPORTING METHOD USING THE SAME

(71) Applicant: HYUNDAI MOTOR COMPANY, Seoul (KR)

(72) Inventors: Jun Hwan Park, Seoul (KR); Dong Han Koo, Seoul (KR)

(73) Assignee: Hyundai Motor Company, Seoul (KR)

( * ) Notice: Subject to any disclaimer, the term of this patent is extended or adjusted under 35 U.S.C. 154(b) by 383 days.

(21) Appl. No.: 15/371,857

(22) Filed: Dec. 7, 2016

(65) Prior Publication Data

US 2018/0056501 A1 Mar. 1, 2018

(30) Foreign Application Priority Data

Sep. 1, 2016 (KR) .......................... 10-2016-0112837

(51) Int. Cl.
| | |
|---|---|
| *B25J 9/00* | (2006.01) |
| *B25J 9/10* | (2006.01) |
| *B25J 9/14* | (2006.01) |
| *F01B 1/01* | (2006.01) |
| *F01B 21/04* | (2006.01) |
| *F01B 31/28* | (2006.01) |

(52) U.S. Cl.
CPC ............. *B25J 9/0006* (2013.01); *B25J 9/108* (2013.01); *B25J 9/14* (2013.01); *F01B 1/01* (2013.01); *F01B 21/04* (2013.01); *F01B 31/28* (2013.01)

(58) Field of Classification Search
CPC .... B25J 17/0275; B25J 18/06; B25J 19/0004; B25J 9/06; B25J 9/0006; B25J 9/14; B25J 9/108; F01B 1/01; F01B 21/04; F01B 31/28
USPC ...................................................... 74/490.07
See application file for complete search history.

(56) References Cited

U.S. PATENT DOCUMENTS

| | | | |
|---|---|---|---|
| 6,672,788 B2 * | 1/2004 | Hathaway | ........... F16C 11/0619 403/132 |
| 9,113,663 B2 | 8/2015 | Stern | |
| 9,532,842 B2 * | 1/2017 | Chauvette | ............. A61F 5/3761 |

(Continued)

FOREIGN PATENT DOCUMENTS

| | | | |
|---|---|---|---|
| JP | 09-290389 A | 11/1997 | |
| JP | 09290389 A | * 11/1997 | ................ B25J 9/06 |

(Continued)

OTHER PUBLICATIONS

Korean Office Action issued in corresponding Korean Patent Application No. 10-2016-0112837, dated Nov. 20, 2017.

*Primary Examiner* — Zakaria Elahmadi
(74) *Attorney, Agent, or Firm* — Morgan, Lewis & Bockius LLP

(57) ABSTRACT

An attitude-supporting apparatus of a wearable robot includes an actuator for generating a hydraulic pressure by a worker's direct manipulation, and a driving unit including, the driving unit including: an inner component and an outer component capable of relatively rotating, and control components for controlling the relative rotations of the inner component and the outer component, wherein a motion of the control components is controlled by receiving the hydraulic pressure generated from the actuator.

13 Claims, 4 Drawing Sheets

(56) References Cited

U.S. PATENT DOCUMENTS

| | | | |
|---|---|---|---|
| 2010/0312360 A1* | 12/2010 | Caspers | A61F 2/66 623/34 |
| 2011/0015647 A1* | 1/2011 | Salisbury, Jr. | B25J 17/0275 606/130 |
| 2013/0048818 A1* | 2/2013 | Von Pechmann | F16M 11/40 248/276.1 |
| 2014/0116240 A1* | 5/2014 | Lim | F15B 15/14 91/166 |
| 2015/0093917 A1* | 4/2015 | Stern | B25J 9/065 439/8 |
| 2017/0340468 A1 | 11/2017 | Akiyama | |

FOREIGN PATENT DOCUMENTS

| | | |
|---|---|---|
| JP | 2014-119078 A | 6/2014 |
| KR | 10-0957379 B1 | 5/2010 |
| KR | 10-1353974 B1 | 1/2014 |
| KR | 10-2014-0055439 A | 5/2014 |
| WO | 2016/093038 A1 | 6/2016 |

* cited by examiner

ATTITUDE-SUPPORTING APPARATUS OF WEARABLE ROBOT AND ATTITUDE-SUPPORTING METHOD USING THE SAME

CROSS REFERENCE TO RELATED APPLICATION

The present application claims the benefit of priority to Korean Patent Application No. 10-2016-0112837, filed Sep. 1, 2016 with the Korean Intellectual Property Office, the entire contents of which is incorporated herein for all purposes by this reference.

TECHNICAL FIELD

The present disclosure generally relates to an attitude-supporting apparatus of a wearable robot and an attitude-supporting method using the same. More particularly, the present disclosure relates to an attitude-supporting apparatus of a wearable robot capable of supporting an attitude when a working worker assumes a fixed posture, and an attitude-supporting method using the same.

BACKGROUND

Robots are actively used in most industries. Wearable robots that are utilized by being worn, as well as robots that are autonomously operated using artificial intelligence, are actively researched.

Regarding the wearable robots, an important technology is detects motion intentions of a wearer and allows a robot to move in response to the wearer's intention. Accordingly, there have been disclosed various control methods for controlling a robot by detecting a wearer's intentions.

However, the disclosed control methods are control methods that are applied during walking in a general situation, so they may not be applied to special situations, such as a case of helping a worker.

In other words, if it is possible to support the fixed posture of a working worker when he or she works in a fixed posture, the worker's fatigue may be considerably reduced.

The foregoing is intended merely to aid in the understanding of the background of the present disclosure, and is not intended to mean that the present disclosure falls within the purview of the related art that is already known to those skilled in the art.

SUMMARY

Accordingly, the present disclosure has been made keeping in mind the above problems occurring in the related art, and the present disclosure is intended to propose an attitude-supporting apparatus of a wearable robot and an attitude-supporting method using the same, which is capable of supporting the posture of a working worker when he or she works in a fixed posture, thereby considerably reducing work fatigue. The apparatus is capable of allowing a worker to move freely when he or she is not in a fixed posture.

In order to achieve the above object, according to one aspect of the present disclosure, there is provided an attitude-supporting apparatus of a wearable robot, the attitude-supporting apparatus including: an actuator generating hydraulic pressure by a worker's direct manipulation; and a driving unit including: an inner component and an outer component capable of performing relative rotations thereof; and control components controlling the relative rotations of the inner component and the outer component, wherein a motion of the control components is controlled by receiving the hydraulic pressure generated from the actuator.

The driving unit may be provided in plural and each of the plurality of driving units may be connected to each other in series; and between neighboring driving units, each inner component may be connected to an associated outer component.

The plurality of driving units may be configured to respectively receive the hydraulic pressure from the actuator through a hydraulic pressure line.

In the plurality of driving units connected to each other in series, an outer component of a driving unit disposed at a first end of the plurality of driving units may be connected to a first wearable device; and an inner component of a driving unit disposed at a second end of the plurality of driving units may be connected to a second wearable device.

The first wearable device and the second wearable device may support a worker's shoulders and pelvis when worn; and the plurality of driving units may support a worker's spine.

The actuator may include: a cylinder; a piston moving along the cylinder; a piston rod connected to the piston, and operated by a worker's direct manipulation; and a spring with opposite ends thereof being supported by the cylinder and the piston, wherein the cylinder is divided into a first chamber and a second chamber based on the piston; and the spring provides elastic force to the piston such that the piston rod protrudes outside the cylinder.

The first chamber and the inner component of the driving unit may be connected to each other through a first hydraulic pressure line; and the second chamber and the outer component of the driving unit may be connected to each other through a second hydraulic pressure line.

The inner component may include: an inner ball part; and an inner protruding part protruding from the inner ball part, wherein the inner ball part includes: an inner space; and a plurality of bearing holes connecting the inner space to an outside of the inner ball part therethrough; and the inner protruding part includes: an inner connection channel connected to the inner space; and an inner protruding part hole connecting the inner connection channel to the hydraulic pressure line.

The outer component may include: an outer ball part; and an outer protruding part protruding from the outer ball part, wherein the outer ball part includes: an outer space receiving the inner ball part; and a through-hole with the inner protruding part penetrating therethrough, wherein the outer space is provided with a plurality of bearing insertion grooves; and the outer protruding part includes: an outer connection channel connected to the outer space; and an outer protruding part hole connecting the outer connection channel to the hydraulic pressure line.

The control components may be ball bearings that are respectively provided in the bearing holes of the inner ball part, and are movable along the bearing holes by the hydraulic pressure transmitted to the driving unit.

When the ball bearings are inserted into the bearing insertion grooves, the relative rotations of the inner component and the outer component may be restrained; and when the ball bearings are separated from the bearing insertion grooves, the relative rotations of the inner component and the outer component may be allowed.

The present disclosure is further intended to propose an attitude-supporting method using a wearable robot, as a method for supporting an attitude using the apparatus according to any one of claims 1 to 11, the attitude-supporting method including: restraining the relative rotations of the inner component and the outer component by operating the control components using hydraulic pressure generated when a worker manipulates the actuator; and releasing restraint of the relative rotations of the inner component and the outer component by operating the control components using hydraulic pressure generated when the worker releases the actuator.

The restraining the relative rotations may be implemented when the worker works in a fixed posture.

The releasing the restraint of the relative rotations may be implemented when the worker intends to move his or her own body.

According to the present disclosure, when a worker intends to work in a fixed posture, an actuator is operated by a worker's direct manipulation, and relative rotations of an inner component and an outer component constituting a driving unit are restrained by using hydraulic pressure generated by the actuator, whereby the worker's physical strength is supported by both the driving unit in a state where the relative rotations of the inner component and the outer component are restrained, and first and the second wearable devices. Thus, it is possible to considerably reduce fatigue when a worker works in a fixed posture.

BRIEF DESCRIPTION OF THE DRAWINGS

The above and other objects, features and other advantages of the present disclosure will be more clearly understood from the following detailed description when taken in conjunction with the accompanying drawings, in which.

DETAILED DESCRIPTION

Figure 1:
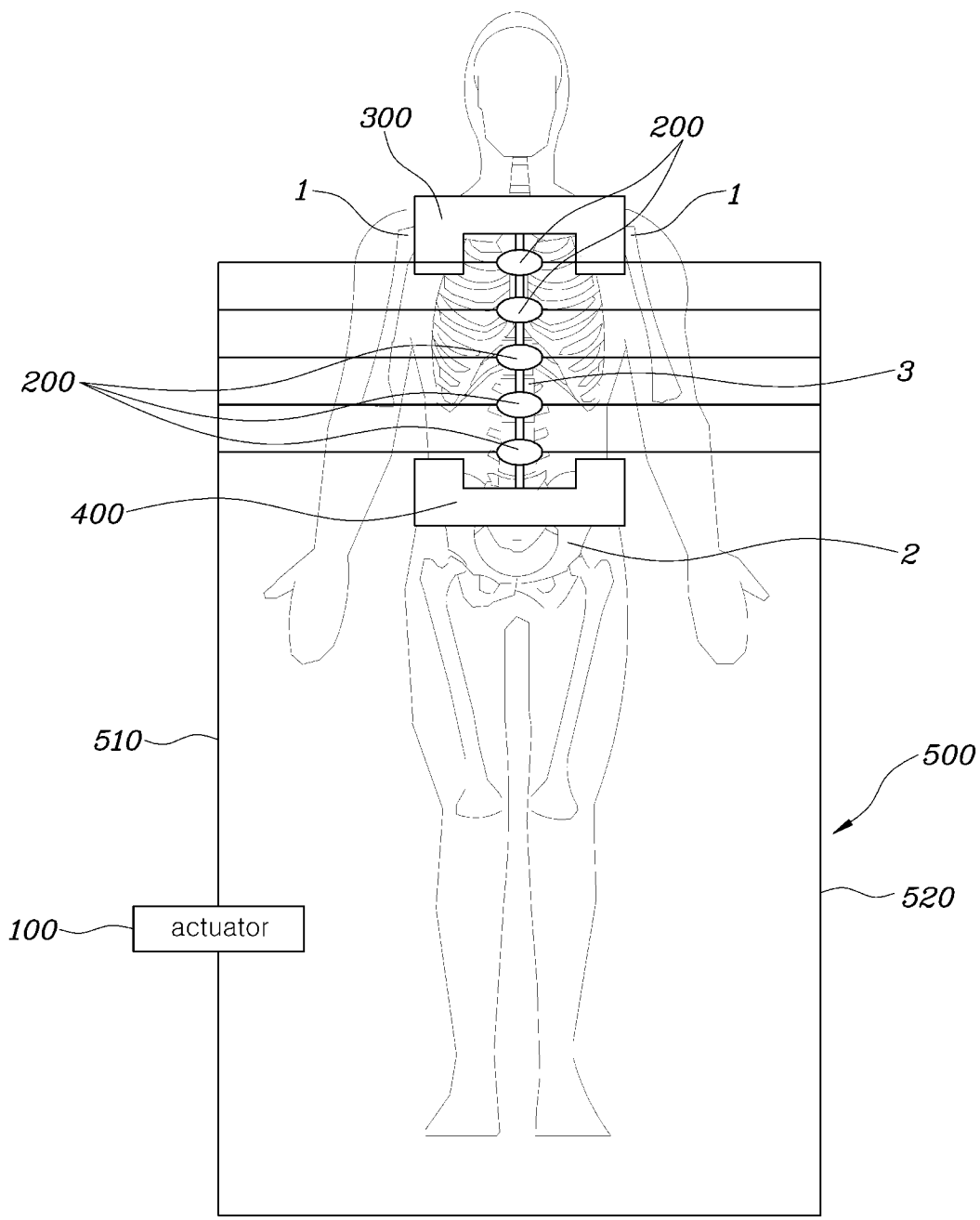
FIG. 1 is a view showing a state where a worker wears an attitude-supporting apparatus of a wearable robot according to exemplary embodiments of the present disclosure.
Figure 2:
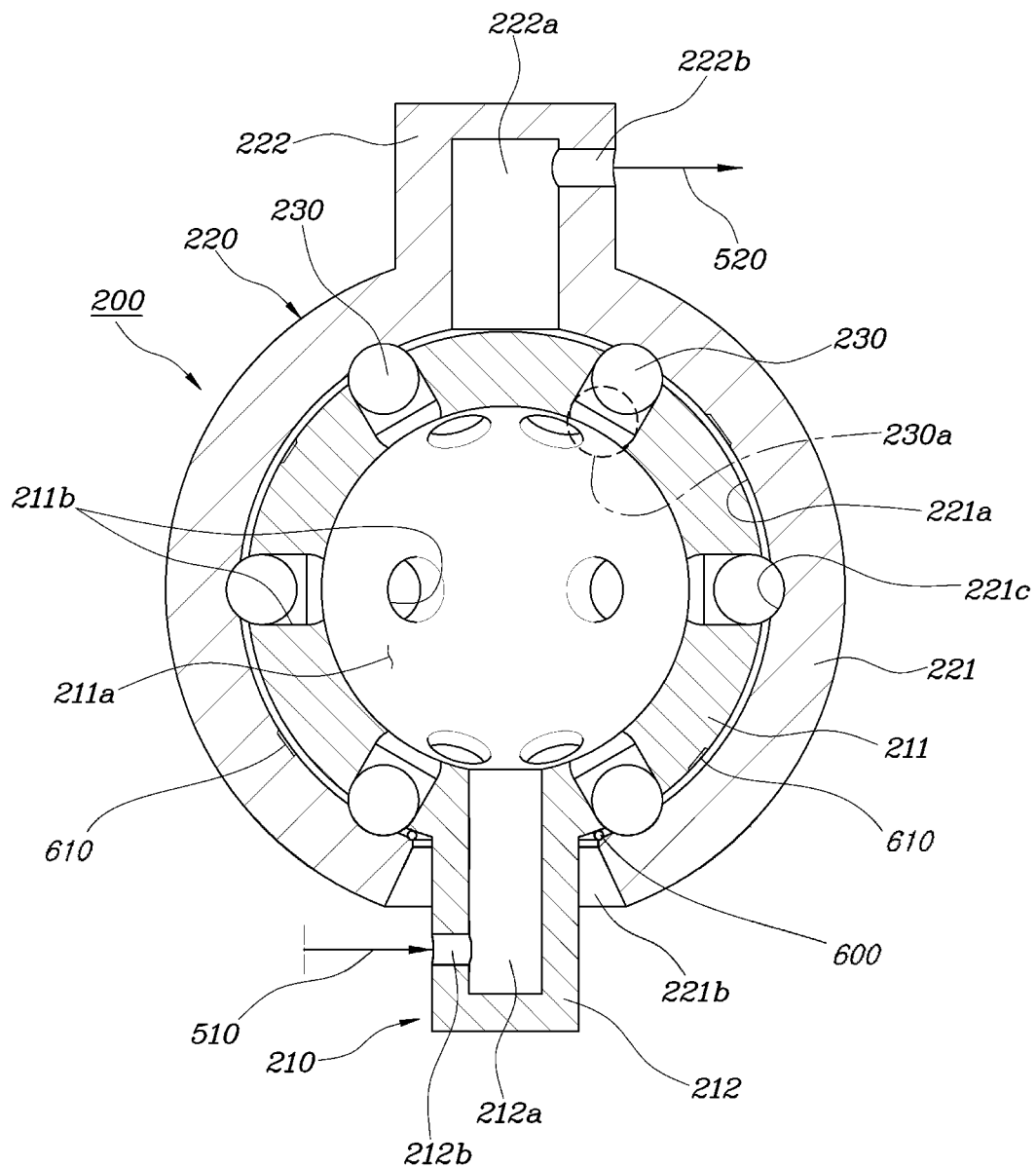
FIG. 2 is a view showing a driving unit according to exemplary embodiments of the present disclosure.

Hereinbelow, an attitude-supporting apparatus of a wearable robot and an attitude-supporting method using the same according to an exemplary embodiment of the present disclosure will be described in detail with reference to the accompanying drawings. Throughout the drawings, the same reference numerals will refer to the same or like parts.

As shown in FIGS. 1 to 4, an attitude-supporting apparatus of a wearable robot according to the present disclosure includes, in some implementations: an actuator 100 generating hydraulic pressure (or pneumatic pressure) by a worker's direct manipulation or an outer energy source through an air compressor or a hydraulic pump; a driving unit 200 including: an inner component 210 and an outer component 220 capable of performing relative rotations thereof; and control components 230 controlling the relative rotations of the inner component 210 and the outer component 220, wherein a motion of the control components is controlled by receiving the hydraulic pressure generated from the actuator 100; and a first wearable device 300 and a second wearable device 400 connected to the driving unit 200 and worn by the worker. In addition, a sealing ring 600 to prevent fluids generating hydraulic pressure from leaking may be more disposed between outwardly exposed portions of the inner component 210 and the outer component 220

The driving unit 200 may be configured to be worn by the worker in some implementations.

The driving unit 200 may be provided in plural by being connected to each other in series; and between neighboring driving units 200, each inner component 210 is connected to an associated outer component 220. Thus, each of a plurality of driving units 200 is integrally connected to each other.

The plurality of driving units 200 is configured to respectively receive the hydraulic pressure from the actuator 100 through a hydraulic pressure line 500. Thereby, when receiving the hydraulic pressure from the actuator 100, the plurality of driving units 200 allows each inner component 210 and each outer component 220 to be restrained simultaneously or to be released simultaneously by the control components 230.

In the plurality of driving units 200 connected to each other in series according to the present disclosure, an outer component 220 of a driving unit 200 disposed at a first end of the plurality of driving units is connected to a first wearable device 300; and an inner component 210 of a driving unit 200 disposed at a second end of the plurality of driving units is connected to a second wearable device 400.

In the drawings of the present disclosure, the first wearable device 300 is connected to an outer component 220 of an uppermost driving unit 200; and the second wearable device 400 is connected to an inner component 210 of a lowermost driving unit 200, but a reverse of the locations of the first wearable device 300 and the second wearable device 400 is possible.

The first wearable device 300 and the second wearable device 400 support a worker's shoulders 1 and pelvis 2 when worn; and the plurality of driving units 200 supports a worker's spine 3.

The actuator 100 includes, in some implementations: a cylinder 110; a piston 120 moving along the cylinder 110; a piston rod 130 connected to the piston 120, and operated by a worker's direct manipulation; and a spring 140 with opposite ends thereof being supported by the cylinder 110 and the piston 120.

The cylinder 110 is divided into a first chamber 111 and a second chamber 112 based on the piston 120, wherein fluids generating hydraulic pressure are filled in the first chamber 111 and the second chamber 112.

The spring 140 provides elastic force to the piston 120 such that the piston rod 130 protrudes outside the cylinder 110. When the worker releases the piston rod 130, the piston 120 and the piston rod 130 are moved in a direction that allows the piston and the piston rod to protrude outside the cylinder 110 by restoring force of the spring 140.

The first chamber 111 and the inner component 210 of the driving unit 200 are connected to each other through a first hydraulic pressure line 510; and the second chamber 112 and the outer component 220 of the driving unit 200 are connected to each other through a second hydraulic pressure line 520. Accordingly, hydraulic pressure transmitted to the inner component 210 through the first hydraulic pressure line 510 flows in the second chamber 112 via the outer component 220 and the second hydraulic pressure line 520. Hydraulic pressure transmitted to the outer component 220 through the second hydraulic pressure line 520 flows in the first chamber 111 via the inner component 210 and the first hydraulic pressure line 510.

The inner component 210 includes, in some implementations: an inner ball part 211; and an inner protruding part 212 protruding from the inner ball part 211.

The inner ball part 211 includes, in some implementations: an inner space 211a; and a plurality of bearing holes 211b connecting the inner space 211a to an outside of the inner ball part therethrough.

The inner protruding part 212 includes, in some implementations: an inner connection channel 212a connected to the inner space 211a; and an inner protruding part hole 212b connecting the inner connection channel 212a to the hydraulic pressure line 500.

The inner protruding part hole 212b is connected to the first hydraulic pressure line 510.

The outer component 220 includes, in some implementations: an outer ball part 221; and an outer protruding part 222 protruding from the outer ball part 221.

The outer ball part 221 includes, in some implementations: an outer space 221a receiving the inner ball part 211; and a through-hole 221b with the inner protruding part 212 penetrating therethrough. Herein, facing surfaces of the inner ball part 211 and the outer ball part 221 may have a plurality of lubricant channels 610 such as net type grooves thereon, respectively, for lubrication.

When the inner ball part 211 and the outer ball part 221 rotate relative to each other, smooth relative rotations are possible when the inner protruding part 212, having penetrated through the through-hole 221b, is not hindered by the outer ball part 221. To achieve this, the through-hole 221b is formed to have a diameter that gradually increases with an increase away from the center of the outer ball part 221.

The outer space 221a is provided with a plurality of bearing insertion grooves 221c.

When a portion of each of the control components 230 protrudes outside the bearing holes 211b by hydraulic pressure transmitted to the driving unit 200, the portion thereof protruding outside the bearing holes 211b is inserted into an associated one of the bearing insertion grooves 221c, and thereby the relative rotations of the inner component 210 and the outer component 220 are restrained by a plurality of the control components 230.

Further, when the control components 230 are separated from the bearing insertion grooves 221c by the hydraulic pressure transmitted to the driving unit 200, the inner component 210 and the outer component 220 are in a non-restraint state so as to allow relative rotations.

The outer protruding part 222 includes, in some implementations: an outer connection channel 222a connected to the outer space 221a; and an outer protruding part hole 222b connecting the outer connection channel 222a to the hydraulic pressure line 500.

The outer protruding part hole 222b is connected to the second hydraulic pressure line 520.

Meanwhile, the control components 230 may be ball bearings that are respectively provided in the bearing holes 211b of the inner ball part 211, and are movable along the bearing holes 211b by the hydraulic pressure transmitted to the driving unit 200, but this disclosure is not limited thereto.

Further, according to the present disclosure, an attitude-supporting method using the apparatus described above includes, in some implementations: restraining the relative rotations of the inner component 210 and the outer component 220 by operating the control components 230 using hydraulic pressure generated when a worker manipulates the actuator 100; and releasing restraint of the relative rotations of the inner component 210 and the outer component 220 by operating the control components 230 using hydraulic pressure generated when the worker releases the actuator 100.

The restraining of the relative rotations is implemented when the worker works in a fixed posture; and the releasing the restraint of the relative rotations is implemented when the worker intends to move.

Hereinbelow, reference will be made in detail to an operation of an embodiment of the present disclosure.

When a worker intends to work in a fixed posture with his or her waist bent, for example, when assembling components such as nuts and bolts, the worker presses the piston rod 130 of the actuator 100 by foot.

Figure 3:
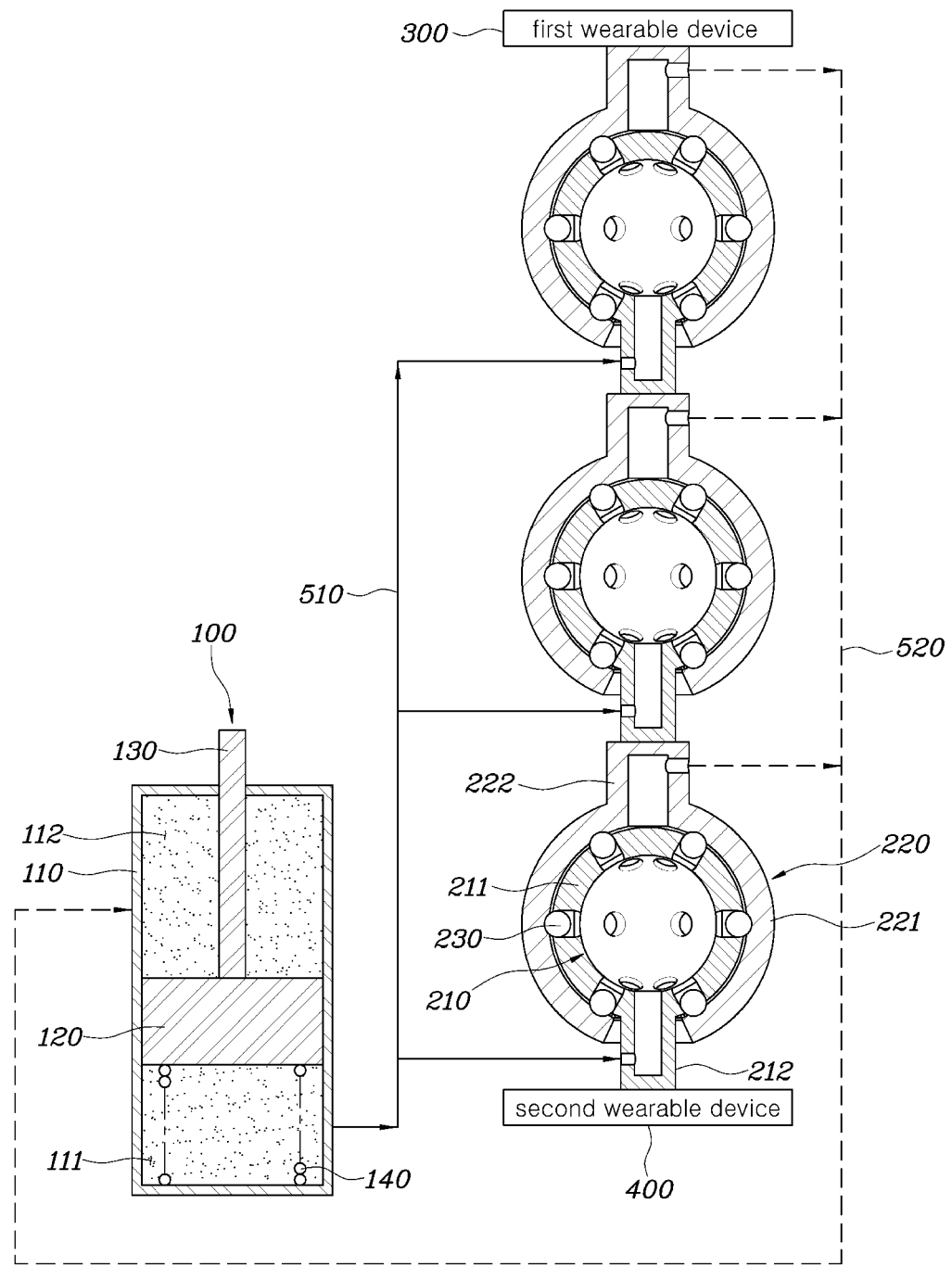
FIG. 3 is a view showing a restraint state of the driving unit according to exemplary embodiments of the present disclosure.

Then, as shown in FIG. 3, a volume of the first chamber 111 is decreased by movement of the piston 120; and hydraulic pressure of the first chamber 111 is transmitted to the inner protruding part hole 212b of the inner component 210 through the first hydraulic pressure line 510, and continues being transmitted to the inner connection channel 212a and the inner space 211a.

By hydraulic pressure transmitted to the inner space 211a of the inner ball part 211, the control components 230 move along the bearing holes 211b toward the outer ball part 221. Then, portions thereof protrude outside the bearing holes 211b, and the portions protruding outside the bearing holes 211b are inserted into the bearing insertion grooves 221c of the outer ball part 221 (the control components are shown in a full line in FIG. 2). Thereby, the relative rotations of the inner component 210 and the outer component 220 constituting the driving unit 200 are restrained by a plurality of the control components 230.

As described above, when the relative rotations of the inner component 210 and the outer component 220 are restrained by the control components 230, the driving unit 200, and the first and the second wearable devices 300 and 400 according to the present disclosure support the physical strength of a worker, whereby it is possible to considerably reduce fatigue when a worker works in a fixed posture.

Meanwhile, hydraulic pressure transmitted to the inner space 211a is transmitted to the outer space 221a of the outer ball part 221 through the bearing holes 211b, and the hydraulic pressure transmitted to the outer space 221a continues flowing in the second chamber 112 of the actuator 100 via the outer connection channel 222a, the outer protruding part hole 222b and the second hydraulic pressure line 520.

Herein, even when the hydraulic pressure transmitted to the inner space 211a is transmitted to the outer space 221a of the outer ball part 221 through the bearing holes 211b, the control components 230 remain inserted in the bearing insertion groove 221c.

Further, when a worker intends to move freely from a fixed posture, the worker releases the piston rod 130.

Figure 4:
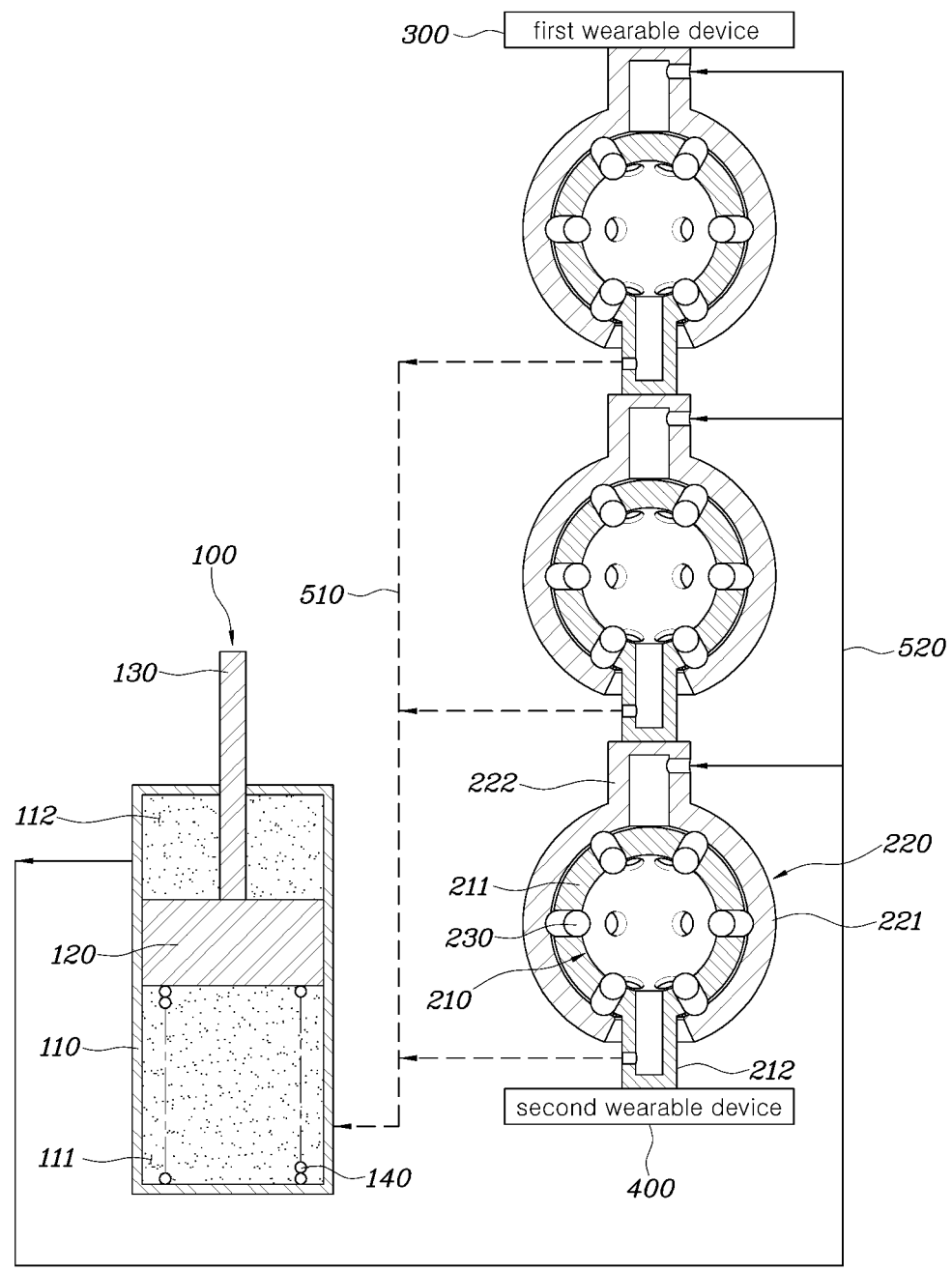
FIG. 4 is a view showing a non-restraint state of the driving unit according to exemplary embodiments of the present disclosure.

Then, as shown in FIG. 4, the piston 120 is moved by the restoring force of the spring 140 to decrease a volume of the second chamber 112; and hydraulic pressure of the second chamber 112 is transmitted to the outer protruding part hole 222b of the outer component 220 through the second hydraulic pressure line 520, and continues being transmitted to the outer connection channel 222a and the outer space 221a.

By the hydraulic pressure transmitted to the outer space 221a of the outer ball part 221, the control components 230 are moved along the bearing holes 211b toward the inner space 211a. Here, the control components 230 are separated from the bearing insertion grooves 221c (the control components shown in a dotted line in FIG. 2). Then, the inner component 210 and the outer component 220 constituting the driving unit 200 are in the non-restraint state, thereby allowing for relative rotation thereof.

As described above, when the inner component 210 and the outer component 220 are in the non-restraint state, the driving unit 200, and the first and the second wearable devices 300 and 400 according to the present disclosure lose bearing power supporting the physical strength of a worker, and thereby the worker is able to move freely without feeling resistance.

Meanwhile, the hydraulic pressure transmitted to the outer space 221a is transmitted to the inner space 211a of the inner ball part 211 through the bearing holes 211b, and the hydraulic pressure transmitted to the inner space 211a continues flowing in the first chamber 111 of the actuator 100 via the inner connection channel 212a, the inner protruding part hole 212b, and the first hydraulic pressure line 510.

As described above, exemplary embodiments according to the present disclosure are configured such that: when a worker intends to work in a fixed posture, instead of using an actuator operated by an additional power source, by using the actuator 100 operated by the worker's direct manipulation, and hydraulic pressure generated by the actuator 100, the relative rotations of the inner component 210 and the outer component 220 constituting the driving unit 200 are restrained. By both the driving unit 200 that is in a state where the relative rotations of the inner component 210 and the outer component 220 are restrained, and the first and the second wearable devices 300 and 400, it is possible to support and augment the physical strength of a worker, whereby it is possible to considerably reduce fatigue when a worker works in a fixed posture.

Further, when a worker intends to move freely from a fixed posture, the worker releases the piston rod 130, and thereby the inner component 210 and the outer component 220 are in the non-restraint state. Thus, the driving unit 200, and the first and the second wearable devices 300 and 400 according to the present disclosure lose bearing power supporting physical strength of a worker, and thereby the worker is able to move freely without feeling resistance.

Although some embodiments of the present disclosure have been described for illustrative purposes, those skilled in the art will appreciate that various modifications, additions and substitutions are possible, without departing from the scope and spirit of the disclosure as disclosed in the accompanying claims.

What is claimed is:

1. An attitude-supporting apparatus of a wearable robot, the attitude-supporting apparatus comprising:
    an actuator for generating a hydraulic pressure by a worker's direct manipulation; and
    a driving unit including:
        an inner component and an outer component capable of relatively rotating; and
        control components for controlling the relative rotations of the inner component and the outer component,
    wherein a motion of the control components is controlled by receiving the hydraulic pressure generated from the actuator,
    wherein the inner component includes an inner ball part comprising:
        an inner space; and
        a plurality of bearing holes connecting the inner space to an outside of the inner ball part therethrough,
    wherein the control components include ball bearings that are respectively disposed in the plurality of bearing holes, and
    wherein the control components are movable along the plurality of bearing holes by the hydraulic pressure transmitted to the driving unit.

2. The attitude-supporting apparatus of claim 1, wherein the driving unit includes a plurality of driving units,
    wherein each of the plurality of driving units is connected to each other in series, and
    wherein, between neighboring driving units, each inner component is connected to an associated outer component.

3. The attitude-supporting apparatus of claim 2, wherein the plurality of driving units are configured to respectively receive the hydraulic pressure from the actuator through a hydraulic pressure line.

4. The attitude-supporting apparatus of claim 2, wherein, in the plurality of driving units connected to each other in series, an outer component of a driving unit disposed at a first end of the plurality of driving units is connected to a first wearable device, and an inner component of a driving unit disposed at a second end of the plurality of driving units is connected to a second wearable device.

5. The attitude-supporting apparatus of claim 4, wherein the first wearable device and the second wearable device support a worker's shoulders and pelvis when worn, and
    wherein the plurality of driving units supports a worker's spine.

6. The attitude-supporting apparatus of claim 1, wherein the actuator includes:
    a cylinder;
    a piston moving along the cylinder;
    a piston rod connected to the piston and operated by a worker's direct manipulation; and
    a spring with opposite ends thereof being supported by the cylinder and the piston,
    wherein the cylinder is divided into a first chamber and a second chamber based on the piston, and
    wherein the spring provides an elastic force to the piston such that the piston rod protrudes outside the cylinder.

7. The attitude-supporting apparatus of claim 6, wherein the first chamber and the inner component of the driving unit are connected to each other through a first hydraulic pressure line, and
    wherein the second chamber and the outer component of the driving unit are connected to each other through a second hydraulic pressure line.

8. The attitude-supporting apparatus of claim 3, wherein the inner component further includes an inner protruding part protruding from the inner ball part,
    wherein the inner protruding part includes:
        an inner connection channel connected to the inner space; and
        an inner protruding part hole connecting the inner connection channel to the hydraulic pressure line.

9. The attitude-supporting apparatus of claim 8, wherein the outer component includes:
    an outer ball part; and
    an outer protruding part protruding from the outer ball part,
    wherein the outer ball part includes:
        an outer space for receiving the inner ball part; and
        a through-hole with the inner protruding part penetrating therethrough,
    wherein the outer space includes a plurality of bearing insertion grooves, and
    wherein the outer protruding part includes:
        an outer connection channel connected to the outer space; and an outer protruding part hole connecting the outer connection channel to the hydraulic pressure line.

10. The attitude-supporting apparatus of claim 9, wherein when the ball bearings are inserted into the bearing insertion grooves, the relative rotations of the inner component and the outer component are restrained, and when the ball bearings are separated from the bearing insertion grooves, the relative rotations of the inner component and the outer component are allowed.

11. An attitude-supporting method using a wearable robot, as a method for supporting an attitude using the apparatus according to claim 1, the attitude-supporting method comprising:
   restraining relative rotations of the inner component and the outer component by operating the control components using hydraulic pressure generated when a worker manipulates the actuator; and
   releasing restraint of the relative rotations of the inner component and the outer component by operating the control components using hydraulic pressure generated when the worker releases the actuator.

12. The attitude-supporting method of claim 11, wherein The step of restraining the relative rotations is implemented when the worker works in a fixed posture.

13. The attitude-supporting method of claim 11, wherein the step of releasing the restraint of the relative rotations is implemented when the worker intends to move his or her own body.

* * * * *